(12) United States Patent
Matsushita et al.

(10) Patent No.: US 8,962,752 B2
(45) Date of Patent: Feb. 24, 2015

(54) RUBBER COMPOSITION AND TIRE USING THE SAME AS WELL AS MODIFIED CONJUGATED DIENE-BASED POLYMER AND METHOD FOR PRODUCING THE SAME

(71) Applicant: Bridgestone Corporation, Tokyo (JP)

(72) Inventors: Junko Matsushita, Tokyo (JP); Yoichi Ozawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/258,185

(22) Filed: Apr. 22, 2014

(65) Prior Publication Data

US 2014/0228525 A1    Aug. 14, 2014

Related U.S. Application Data

(62) Division of application No. 12/921,536, filed as application No. PCT/JP2009/054556 on Mar. 10, 2009, now Pat. No. 8,729,184.

(30) Foreign Application Priority Data

Mar. 10, 2008 (JP) .................................. 2008-059890
Aug. 8, 2008 (JP) .................................. 2008-205812

(51) Int. Cl.
| | | |
|---|---|---|
| *C08L 15/00* | (2006.01) | |
| *C08F 4/54* | (2006.01) | |
| *C08K 3/00* | (2006.01) | |
| *C08G 18/04* | (2006.01) | |
| *B60C 1/00* | (2006.01) | |
| *C08C 19/22* | (2006.01) | |
| *C08C 19/44* | (2006.01) | |
| *C08L 7/00* | (2006.01) | |
| *C08L 21/00* | (2006.01) | |

(52) U.S. Cl.
CPC . *C08G 18/04* (2013.01); *B60C 1/00* (2013.01); *C08C 19/22* (2013.01); *C08C 19/44* (2013.01); *C08L 7/00* (2013.01); *C08L 15/00* (2013.01); *C08L 21/00* (2013.01); *C08K 3/0033* (2013.01)

USPC ........ 524/847; 524/572; 524/575.5; 525/191; 525/192; 525/232; 525/233; 525/333.9

(58) Field of Classification Search
CPC .......... C08G 18/14; B60C 1/00; C08C 19/22; C08C 19/44; C08L 7/00; C08L 15/00; C08L 21/00; C08K 3/0033
USPC ......... 524/847, 575, 575.5; 525/55, 191, 192, 525/232, 233, 333.9
See application file for complete search history.

(56) References Cited

U.S. PATENT DOCUMENTS

| | | | |
|---|---|---|---|
| 7,893,153 B2 * | 2/2011 | Tanaka et al. ................. | 524/588 |
| 2010/0105827 A1 | 4/2010 | Tanaka et al. | |
| 2010/0222502 A1 | 9/2010 | Tanaka et al. | |

FOREIGN PATENT DOCUMENTS

| | | |
|---|---|---|
| EP | 1 734 060 A1 | 12/2006 |
| EP | 1 873 168 A1 | 1/2008 |
| EP | 2 169 002 A1 | 3/2010 |
| WO | 2006/112540 A1 | 10/2006 |
| WO | 2007/040252 A1 | 4/2007 |
| WO | 2007/083765 A1 | 7/2007 |
| WO | 2008/078813 A1 | 7/2008 |
| WO | 2008153030 A1 | 12/2008 |
| WO | 2009/022665 A1 | 2/2009 |

* cited by examiner

*Primary Examiner* — Kelechi Egwim
(74) *Attorney, Agent, or Firm* — Sughrue Mion, PLLC

(57) ABSTRACT

This invention relates to a rubber composition being excellent in the low heat buildup and fracture properties (resistance to crack growth). and more particularly to a rubber composition, characterized by compounding 10-100 parts by mass of an inorganic filler and/or carbon black based on 100 parts by mass of a rubber component including not less than 10 mass % of a modified conjugated diene-based polymer having a cis-1,4 bond content of not less than 90% and a vinyl bond content of not more than 1.2% and a primary amino group. In this case, the modified conjugated diene-based polymer is obtained by (1) reacting the predetermined conjugated diene-based polymer having an active terminal with a compound having two or more predetermined functional groups and (2) further reacting the resulting product with a compound having a primary amino group.

6 Claims, No Drawings

RUBBER COMPOSITION AND TIRE USING THE SAME AS WELL AS MODIFIED CONJUGATED DIENE-BASED POLYMER AND METHOD FOR PRODUCING THE SAME

This is a divisional of application Ser. No. 12/921,536, filed Dec. 8, 2010, which is a 371 of PCT/JP2009/054556, filed Mar. 10, 2009, which claims priority from Japanese Patent Application No. 2008-059890, filed Mar. 10, 2008, and Japanese Patent Application No. 2008-205812, filed Aug. 8, 2008, the contents of which are hereby incorporated by reference into this application.

TECHNICAL FIELD

This invention relates to a modified conjugated diene-based polymer and a method of producing the same as well as a rubber composition and a tire using such a polymer, and more particularly to a rubber composition being excellent in the low heat buildup and fracture properties (resistance to crack growth).

RELATED ART

Recently, tires having a low rolling resistance are required in order to save fuel consumption of an automobile under social demand for energy saving and resource saving, and hence a rubber composition being excellent in the low heat buildup (low loss factor) and fracture properties as compared with the conventional ones is desired. In order to reduce the rolling resistance of the tire, it is common to use a rubber composition having a low heat buildup. Particularly, the use of a polymer introduced with a functional group interacting with a filler in a rubber composition as a rubber component is a very effective means. For instance, it is investigated to apply a modified high-cis polybutadiene rubber or the like introduced with a functional group interacting with the filler to a rubber composition (WO 2006/112450 brochure).

In a high-cis polybutadiene rubber produced by coordination polymerization under industrial conditions, however, the reactivity of a modifier to a polymer terminal is low, so that the introduction of a functional group having a high affinity with a filler can be only attained at a reaction efficiency of about 30% to total polymer terminal. Therefore, when the high-cis polybutadiene rubber is used, it is difficult to improve low loss factor of the rubber composition. On the other hand, in an anion polymerization system capable of introducing a functional group having a high affinity with a filler at a reaction efficiency of approximately 100% to a polymer terminal, the low loss factor of the rubber composition can be largely improved, but it is confirmed that the fracture properties are low as compared with a rubber composition compounded with an unmodified high-cis polybutadiene rubber obtained in the coordination polymerization system.

Moreover, it is known that the modified high-cis polybutadiene rubber introduced with a functional group interacting with the filler is superior in the fracture properties to the unmodified high-cis polybutadiene rubber, and hence modified high-cis polybutadiene rubbers capable of improving low loss factor of a rubber composition are desired.

DISCLOSURE OF THE INVENTION

As mentioned above, the modified high-cis polybutadiene rubber introduced with the functional group interacting with the filler improves the low loss factor and fracture properties of the rubber composition, so that a certain measure of successful results is brought by serious studies and developments. However, the reaction efficiency between the polymer terminal and the modifying agent is still low, and there is a limit for improving the low loss factor by increasing the reaction efficiency.

The inventors have made investigations on functional groups to be introduced into a polymer terminal and found that the low loss factor can be improved to a new level by introducing an amino group with active hydrogen having a very high affinity with carbon black into a polymer terminal. As a result of further investigations, it has been found that the introduction of a primary amino group into a polymer terminal is significant in the low loss factor as compared with the introduction of a secondary amino group or a tertiary amino group.

It is, therefore, an object of the invention to provide a modified conjugated diene-based polymer capable of improving low heat buildup and fracture properties (resistance to crack growth) of a rubber composition and a method of producing such a modified conjugated diene-based polymer. Also, it is another object of the invention to provide a rubber composition using the modified conjugated diene-based polymer as a rubber component as well as a tire using such a rubber composition.

The inventors have made various studies in order to achieve the above objects and discovered that a modified conjugated diene-based polymer having specified cis-1,4 bond content and vinyl bond content and a primary amino group is obtained by (1) reacting a compound having two or more predetermined functional groups with a given conjugated diene-based polymer having an active terminal and (2) further reacting the resulting product with a compound having a primary amino group, and that low heat buildup and fracture properties can be largely improved by applying a rubber composition using the modified conjugated diene-based polymer as a rubber component and further compounding a specified filler to a tire, and as a result, the invention has been accomplished.

That is, the rubber composition according to the invention is characterized by compounding 10-100 parts by mass of an inorganic filler and/or carbon black based on 100 parts by mass of a rubber component including not less than 10 mass % of a modified conjugated diene-based polymer having a cis-1,4 bond content of not less than 90% and a vinyl bond content of not more than 1.2% and a primary amino group.

Moreover, the cis-1,4 bond content means a ratio of cis-1,4 bond in a conjugated diene compound unit of the polymer, and the vinyl bond content means a ratio of vinyl bond in the conjugated diene compound unit of the polymer.

In the rubber composition according to the invention, the modified conjugated diene-based polymer is preferable to have a vinyl bond content of not more than 0.8%.

In the rubber composition according to the invention, carbon black is preferable to have a nitrogen adsorption specific surface area of 20-180 $m^2/g$, more preferably 20-100 $m^2/g$.

In a preferable embodiment of the rubber composition according to the invention, the rubber component comprises 10-90 mass % of the modified conjugated diene-based polymer and 90-10 mass % of a diene-based polymer other than the modified conjugated diene-based polymer. In this case, the diene-based polymer other than the modified conjugated diene-based polymer is preferable to be natural rubber.

The rubber composition according to the invention is preferable to be sulfur cross-linkable.

Also, the tire according to the invention is characterized by using the above-mentioned rubber composition in any tire member.

Further, the method of producing the modified conjugated diene-based polymer according to the invention is characterized by comprising:

(1) a step of reacting a conjugated diene-based polymer having a cis-1,4 bond content of not less than 90% and a vinyl bond content of not more than 1.2% and an active terminal with a compound X having a functional group A indicating a reactivity to the active terminal and at least one reactive functional group B (provided that the functional group A and the functional group B may be same) to obtain a primary modified conjugated diene-based polymer; and (2) a step of reacting the primary modified conjugated diene-based polymer with a compound Y having a functional group C indicating a reactivity to the reactive functional group B and at least one primary amino group or protected primary amino group (provided that the functional group C may be the primary amino group or the protected primary amino group) to obtain a secondary modified conjugated diene-based polymer.

In the production method of the modified conjugated diene-based polymer according to the invention, the conjugated diene-based polymer is preferable to have a vinyl bond content of not more than 0.8%.

In a preferable embodiment, the production method of the modified conjugated diene-based polymer according to the invention further comprises (3) a step of hydrolyzing the secondary modified conjugated diene-based polymer to deprotect the protected primary amino group derived from the compound Y.

In another preferable embodiment of the production method of the modified conjugated diene-based polymer according to the invention, the conjugated diene-based polymer is synthesized with a rare earth metal as a catalyst.

In the other preferable embodiment of the production method of the modified conjugated diene-based polymer according to the invention, the compound X is polymethylene polyphenyl polyisocyanate, and the compound Y is hexamethylene diamine.

Moreover, the modified conjugated diene-based polymer according to the invention is characterized by producing through the above method.

According to the invention, there can be provided a modified conjugated diene-based polymer having specified cis-1,4 bond content and vinyl bond content and a primary amino group and capable of giving low heat buildup and fracture properties (resistance to crack growth) to a rubber composition and a method of producing the modified conjugated diene-based polymer by (1) reacting a given conjugated diene-based polymer having a compound having two or more given functional groups and (2) reacting the resulting product with a compound having a primary amino group. In addition, there can be provided a rubber composition having excellent low heat buildup and fracture properties (resistance to crack growth) and a tire by using the above modified conjugated diene-based polymer.

BEST MODE FOR CARRYING OUT THE INVENTION

The invention will be described in detail below. The rubber composition according to the invention is characterized by compounding 10-100 parts by mass of an inorganic filler and/or carbon black based on 100 parts by mass of a rubber component containing not less than 10 mass % of a modified conjugated diene-based polymer having a cis-1,4 bond content of not less than 90%, a vinyl bond content of not more than 1.2% and a primary amino group. At this moment, the modified conjugated diene-based polymer used as the rubber component in the rubber composition according to the invention is a polymer indicating a stretching crystallinity because the cis-1,4 bond content is not less than 90% and the vinyl bond content is not more than 1.2%. Also, the modified conjugated diene-based polymer is generally low in the reaction efficiency to a modifying agent. However, the modified conjugated diene-based polymer used as a rubber component in the rubber composition according to the invention is very high in the affinity with a filler such as inorganic filler, carbon black or the like due to the introduction of the primary amino group, and can disperse the filler effectively even in the reaction efficiency. Therefore, the rubber composition according to the invention improves the fracture properties owing to the stretching crystallinity of the modified conjugated diene-based polymer and can largely improve the low heat buildup because the dispersibility of the filler is further improved. Moreover, the production method of the modified conjugated diene-based polymer used as a rubber component in the rubber composition according to the invention will be described in detail below.

The rubber component in the rubber composition according to the invention is required to include not less than 10 mass % of the modified conjugated diene-based polymer. When the ratio of the modified conjugated diene-based polymer included in the rubber component is less than 10 mass %, the effect of improving the dispersibility of the filler becomes particularly small and the low heat buildup of the rubber composition is not obtained sufficiently. In the rubber composition according to the invention, the modified conjugated diene-based polymer may be used by combining with a rubber component other than the modified conjugated diene-based polymer. As the rubber component (diene-based polymer) other than the modified conjugated diene-based polymer are mentioned natural rubber (NR), polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR) and so on, and among them natural rubber is preferable. These rubber components other than the modified conjugated diene-based polymer may be used alone or in a blend of two or more. Moreover, when the modified conjugated diene-based polymer is combined with the diene-based polymer such as natural rubber or the like other than the modified conjugated diene-based polymer, the rubber component is preferable to comprise 10-90 mass % of the modified conjugated diene-based polymer and 90-10 mass % of the diene-based polymer other than the modified conjugated diene-based polymer.

In the rubber composition according to the invention, the inorganic filler and/or carbon black is compounded in an amount of 10-100 parts by mass based on 100 parts by mass of the rubber component as a filler. When the amount of the inorganic filler and/or carbon black compounded is less than 10 parts by mass, the fracture properties of the rubber composition are deteriorated, while when it exceeds 100 parts by mass, the low heat buildup of the rubber composition may be deteriorated.

The carbon black is not particularly limited, but is preferable to have a nitrogen adsorption specific surface area of 20-180 $m^2/g$, more preferably 20-100 $m^2/g$. When the carbon black has a nitrogen adsorption specific surface area of 20-180 $m^2/g$, the particle size is large and the effect of improving the low heat buildup is very high. As the carbon black are concretely preferable grades of not more than HAF, which include, for example, HAF, FF, FEF, GPF, SRF, FT grades. From viewpoint of the fracture properties, HAF, FEF and GPF grades are particularly preferable. As the inorganic filler are mentioned silica, talc, aluminum hydroxide and so on. Moreover, these fillers may be used alone or in a combination of two or more.

The rubber composition according to the invention can be produced by compounding the rubber component with the inorganic filler and/or carbon black and additives usually used in the rubber industry and properly selected from a softening agent, stearic acid, an antioxidant, zinc oxide, a vulcanization accelerator, a vulcanizing agent and so on without damaging the object of the invention, and milling, warming, extruding them.

Moreover, the rubber composition according to the invention is preferable to be sulfur cross-linkable, and it is preferable to use sulfur or the like as a vulcanizing agent. The amount of the vulcanizing agent used is preferably 0.1-10.0 parts by mass, more preferably 1.0-5.0 parts by mass based on 100 parts by mass of the rubber component as a sulfur amount.

Also, the tire according to the invention is characterized by using the above rubber component in a tire member. As the tire member are mentioned, for example, a tire tread, an under-tread, a carcass, a sidewall, a bead portion and the like. Moreover, the tire according to the invention is obtained by using the rubber composition at an uncured state to form tire members, forming a green tire therefrom according to a usual manner, and vulcanizing the green tire. The tire obtained by applying the rubber composition to any tire member is excellent in the fracture properties (resistance to crack growth) and low heat buildup. As a gas to be filled in the tire may be used common air or air having an adjusted partial oxygen pressure as well as an inert gas such as nitrogen, argon, helium or the like.

The modified conjugated diene-based polymer according to the invention and the production method thereof will be described in detail below. The method of producing the modified conjugated diene-based polymer according to the invention is characterized by comprising (1) a step of reacting a conjugated diene-based polymer having a cis-1,4 bond content of not less than 90% and a vinyl bond content of not more than 1.2% and an active terminal with a compound X having a functional group A indicating a reactivity to the active terminal and at least one reactive functional group B (provided that the functional group A and the functional group B may be same) to obtain a primary modified conjugated diene-based polymer (primary modification reaction); and (2) a step of reacting the primary modified conjugated diene-based polymer with a compound Y having a functional group C indicating a reactivity to the reactive functional group B and at least one primary amino group or protected primary amino group (provided that the functional group C may be the primary amino group or the protected primary amino group) to obtain a secondary modified conjugated diene-based polymer (secondary modification reaction), and may further comprise (3) a step of hydrolyzing the secondary modified conjugated diene-based polymer to deprotect the protected primary amino group derived from the compound Y (deprotection reaction), if necessary.

The modified conjugated diene-based polymer obtained through the steps (1) and (2) or the modified conjugated diene-based polymer obtained through the steps (1), (2) and (3) has a cis-1,4 bond content of not less than 90%, a vinyl bond content of not more than 1.2% and a primary amino group, so that it can be used as a modified conjugated diene-based polymer in the rubber composition, and hence the fracture properties and low heat buildup of the rubber composition are improved largely. Moreover, the compound having a reactivity with the active terminal of the conjugated diene-based polymer and a primary amino group is not commercially available and also it is difficult to introduce the primary amino group into the conjugated diene-based polymer, so that double modification reaction (primary modification reaction and secondary modification reaction) for obtaining the modified conjugated diene-based polymer is carried out in the production method according to the invention.

The modified conjugated diene-based polymer according to the invention is required to have a cis-1,4 bond content of not less than 90%. When the cis-1,4 bond content is less than 90%, the low loss factor in the rubber composition can not be obtained sufficiently. Also, the modified conjugated diene-based polymer according to the invention is required to have a vinyl bond content of not more than 1.2%. When the vinyl bond content exceeds 1.2%, the crystallinity of the polymer is deteriorated.

Furthermore, the modified conjugated diene-based polymer according to the invention has a primary amino group or a protected primary amino group in its molecule. Thus, when the modified conjugated diene-based polymer according to the invention has the primary amino group in its molecule, the polymer is directly used as a rubber component, while when the modified conjugated diene-based polymer according to the invention has the protected primary amino group in its molecule, the polymer deprotected through the above step (3) is used as a rubber component, whereby the low heat buildup of the resulting rubber composition can be improved largely.

In addition, the number average molecular weight of the modified conjugated diene-based polymer according to the invention is not particularly limited, which does not cause a problem of decreasing the molecular weight in a production process mentioned later. Furthermore, the molecular weight distribution represented by a ratio of weight average molecular weight (Mw) to number average molecular weight (Mn) is preferably not more than 3.5, more preferably not more than 3.0, most preferably not more than 2.5. At this moment, the average molecular weight and molecular weight distribution can be determined by a gel permeation chromatography (GPC) using polystyrene as a standard substance.

Moreover, the Mooney viscosity [$ML_{1+4}$ (100° C.)] of the modified conjugated diene-based polymer according to the invention is preferably 10-100, more preferably 20-80. When the Mooney viscosity [$ML_{1+4}$ (100° C.)] is less than 10, there is a tendency of deteriorating the rubber properties inclusive of fracture properties, while when it exceeds 100, the processability is deteriorated, and the milling with additives may be difficult.

In the production of the modified conjugated diene-based polymer according to the invention, it is first required to obtain a primary modified conjugated diene-based polymer through the step (1).

The conjugated diene-based polymer used in the step (1) has a cis-1,4 bond content of not less than 90%, a vinyl bond content of not more than 1.2% and an active terminal. The production method of such a conjugated diene-based polymer is not particularly limited, and may use a production method using the conventionally well-known polymerization reaction, but a production method using a coordination polymerization is preferable. Also, when a solvent is used in the polymerization reaction, such a solvent may be inactive in the polymerization reaction and includes, for example, butane, pentane, hexane, heptane, cyclopentane, cyclohexane, 1-butene, 2-butene, benzene, toluene, xylene, methylene chloride, chloroform, carbon tetrachloride, trichloroethylene, perchloroethylene, 1,2-dichloroethane, chlorobenzene, bromobenzene, chlorotoluene and so on. Furthermore, the temperature of the polymerization reaction is preferably a range of −30° C.-200° C., more preferably a range of 0° C.-150° C. In addition, it is preferable to take a care that the incorporation of a compound having a deactive action such as oxygen, water, carbon dioxide gas or the like into the polymerization system is removed as far as possible in order not to deactivate the active terminal of the conjugated diene-based polymer produced. Moreover, the polymerization system is not particularly limited, and may be a batch type or a continuous type.

The conjugated diene-based polymer is preferable to be a homopolymer of a conjugated diene compound or a copolymer of an aromatic vinyl compound and a conjugated diene compound. As the conjugated diene compound being a monomer are mentioned 1,3-butadiene, isoprene, 1,3-pentadiene, 2,3-dimethylbutadiene, 2-phenyl-1,3-butadiene, 1,3-hexadiene, myrcene and the like, and among them 1,3-butadiene and isoprene are preferable. On the other hand, as the aromatic vinyl compound being a monomer are mentioned styrene, p-methylstyrene, m-methylstyrene, p-tert-butylstyrene, α-methylstyrene, chloromethylstyrene, vinyl toluene and the like.

The conjugated diene-based polymer is preferable to be synthesized with a rare earth metal as a catalyst, and is obtained, for example, by polymerizing the monomer(s) in the presence of a polymerization catalyst composition comprising the following components (a)-(c) as a main component.

Component (a): a lanthanoid element-containing compound containing at least one of lanthanoid elements (rare earth elements corresponding to atomic numbers of 57-71 in the Periodic Table) or a reaction product obtained by reacting the lanthanoid element-containing compound with a Lewis base Component (b): alumoxane and/or an organoaluminum compound represented by a general formula (I): $AlR^1R^2R^3$ (in the general formula (I), $R^1$ and $R^2$ may be same or different and are a hydrocarbon group having a carbon number of 1-10 or a hydrogen atom, and $R^3$ may be same as or different from $R^1$ and $R^2$ and is a hydrocarbon group having a carbon number of 1-10)

Component (c): a halogen-containing compound containing at least one halogen element in its molecule By polymerizing with such a catalyst to produce a conjugated diene-based polymer can be obtained a conjugated diene-based polymer having a narrow molecular weight distribution and a high cis-1,4 bond content. Also, this catalyst (catalyst composition) is cheap as compared with the conventional metallocene catalyst but also has not a requirement that the polymerization reaction is carried out at an extremely low temperature. Therefore, the operation is simple and is useful as an industrially production process.

The component (a) used in the polymerization catalyst composition is a lanthanoid element-containing compound containing at least one of lanthanoid elements (rare earth elements corresponding to atomic numbers of 57-71 in the Periodic Table) or a reaction product obtained by reacting the lanthanoid element-containing compound with a Lewis base. As a concrete example of the lanthanoid element may be mentioned neodymium, praseodymium, cerium, lanthanum, gadolinium, samarium and the like. Among them, neodymium is preferable. Moreover, these lanthanoid elements may be used alone or in a combination of two or more. As a concrete example of the lanthanoid element-containing compound may be mentioned carboxylates, alkoxides, β-diketone complexes, phosphates, phosphites and the like of these lanthanoid elements. Among them, carboxylates or phosphates are preferable, and further carboxylates are preferable.

As the carboxylate of the lanthanoid element are preferably mentioned salts of 2-hexylhexane, naphthenic acid, versatic acid [trade name, made by Shell Chemicals Co., Ltd. carboxylic acid having a carboxyl group bonded to a tertiary carbon atom) and the like. As a concrete example of the alkoxide of the lanthanoid element may be mentioned a compound represented by a general formula (II): $(R^4O)_3M$ (in the general formula (II), M is a lanthanoid element, and $R^4$ is a hydrocarbon group having a carbon number of 1-20). As an alkoxy group represented by "$R^4O$" in the formula (II), are preferably mentioned 2-ethyl-hexylalkoxy group, benzylalkoxy group and the like. As the β-diketone complex of the lanthanoid element are preferably mentioned acetylacetone complex, ethylacetylacetone complex and the like. As the phosphate or phosphite of the lanthanoid element are preferably mentioned bis(2-ethylhexyl)phosphate, bis(1-methylheptyl)phosphate, 2-ethylhexyl phosphonic acid mono-2-ethylhexyl, bis(2-ethylhexyl)phosphinic acid and the like.

Among the above-mentioned ones, phosphate of neodymium or carboxylate of neodymium is further preferable as the lanthanoid element-containing compound, and the carboxylate such as neodymium 2-ethylhexanoate, neodymium versatate or the like is particularly preferable.

In order to solubilize the lanthanoid element-containing compound in a solvent or store stably for a long time, it is also preferable to mix the lanthanoid element-containing compound with a Lewis base or react the lanthanoid element-containing compound with a Lewis base to form a reaction product. The amount of the Lewis base is preferably 0-30 mol, more preferably 1-10 mol per 1 mol of the lanthanoid element. As a concrete example of the Lewis base may be mentioned acetylacetone, tetrahydrofuran, pyridine, N,N-dimethylformamide, thiophene, diphenyl ether, triethylamine, an organophosphorus compound, a monovalent or divalent alcohol and the like. The above-mentioned components (a) may be used alone or in a combination of two or more.

The component (b) used in the polymerization catalyst composition is alumoxane and/or an organoaluminum compound represented by the general formula (I). Alumoxane (which is also called as aluminoxane) is a compound of a structure represented by the following general formula (III) or (IV). Moreover, it may be an association body of alumoxane disclosed in Fine Chemical, 23, (9), 5 (1994), J. Am. Chem. Soc., 115, 4971 (1993) and J. Am. Chem. Soc., 117, 6465 (1995).

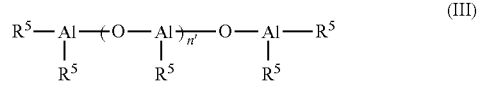

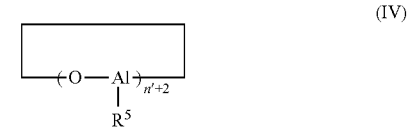

In the general formulae (III) and (IV), $R^5$ is a hydrocarbon group having a carbon number of 1-20, which includes concretely methyl group, ethyl group, propyl group, butyl group, isobutyl group, t-butyl group, hexyl group, isohexyl group, octyl group, isooctyl group and the like. Among them, methyl group is particularly preferable. n' is an integer of not less than 2, and is preferable to be an integer of 4-100.

As a concrete example of alumoxane may be mentioned methylalumoxane (MAO), ethylalumoxane, n-propylalumoxane, n-butylalumoxane, isobutylalumoxane, t-butylalumoxane, hexylalumoxane, isohexylalumoxane and the like. Alumoxane can be produced by a well-known method. For example, it can be produced by adding trialkyl aluminum or dialkyl aluminum chloride to an organic solvent such as benzene, toluene, xylene or the like, further adding water, steam, steam-containing nitrogen gas, or a salt containing water of crystallization such as 6 hydrate of copper sulfate, 16 hydrate of aluminum sulfate or the like to conduct the reaction. Moreover, the alumoxanes may be used alone or in a combination of two or more.

As a concrete example of the organoaluminum compound represented by the general formula (I) may be mentioned triethyl aluminum, triisobutyl aluminum, hydrogenated diethyl aluminum, hydrogenated diisobutyl aluminum and the like. Moreover, the organoaluminum compounds may be used alone or in a combination of two or more.

The component (c) used in the polymerization catalyst composition is a halogen-containing compound containing at least one halogen element in its molecule, and may preferably include, for example, a reaction product between a metal halide and a Lewis base, diethylaluminum chloride, silicon tetrachloride, trimethylchlorosilane, methyldichlorosilane, dimethyldichlorosilane, methyltrichlorosilane, ethylaluminum dichloride, ethylaluminum sesquichloride, tin tetrachloride, tin trichloride, phosphorus trichloride, benzoyl chloride, t-butyl chloride, trimethylsilyl iodide, triethylsilyl iodide, dimethylsilyl diiode, diethylaluminum iodide, methyl iodide, butyl iodide, hexyl iodide, octyl iodide, iodoform, diiodomethane, iodine, benzylidene iodide and the like.

As the metal halide usable in the reaction product between the metal halide and Lewis base are mentioned magnesium chloride, manganese chloride, zinc chloride, magnesium iodide, manganese iodide, zinc iodide, copper iodide and the like. As the Lewis base may be preferably used a phosphorus compound, a carbonyl compound, a nitrogen compound, an ether compound, an alcohol and so on. Concretely, there may be preferably mentioned tri-2-ethylhexyl phosphate, tricresyl phosphate, acetylacetone, 2-ethylhexanoic acid, versatic acid, 2-ethylhexyl alcohol, 1-decanol, lauryl alcohol and the like. The Lewis base is preferably reacted at a ratio of 0.01 mol-30 mol, more preferably 0.5 mol-10 mol per 1 mol of the metal halide. When the reaction product with the Lewis base is used, metal(s) remaining in the polymer can be reduced.

Moreover, the compounding ratio of the components (a)-(c) as a main component of the catalyst may be properly set, if necessary. The amount of the component (a) used is preferably 0.00001 mmol-1.0 mmol, more preferably 0.0001 mmol-0.5 mmol per 100 g of the monomer.

When the component (b) is alumoxane, the preferable amount of the alumoxane included in the catalyst can be represented by a molar ratio of component (a) to aluminum (Al) included in the alumoxane. That is, a molar ratio of "component (a)" to aluminum (Al) included in alumoxane is preferably 1:1-1:500, more preferably 1:3-1:250, particularly preferably 1:5-1:200. On the other hand, when the component (b) is an organoaluminum compound, the preferable amount of the organoaluminum compound included in the catalyst can be represented by a molar ratio of component (a) to organoaluminum compound. That is, the molar ratio of "component (a)" to "organoaluminum compound" is preferably 1:1-1:700, more preferably 1:3-1:500.

Also, the preferable amount of the component (c) included in the catalyst composition can be represented by a molar ratio of a halogen atom included in the component (c) to component (a). That is, the molar ratio of (halogen atom)/(component (a)) is preferably 20-0.1, more preferably 15-0.2, particularly preferably 8-0.5.

The catalyst may be previously prepared by using the same conjugated diene compound and/or non-conjugated diene compound as in the monomer for polymerization in addition to the above components (a)-(c).

The catalyst composition may be prepared, for example, by reacting the components (a)-(c) dissolved in a solvent and, if necessary, a conjugated diene compound and/or non-conjugated diene compound added. Moreover, the addition order of the components is optional. However, it is preferable that the components are mixed and reacted and then matured from a viewpoint of improvement of polymerization activity, and shortening of induction period for the start of polymerization. The maturing temperature is preferably 0° C-100° C., more preferably 20° C-80° C. Moreover, the maturing time is not particularly limited. The components may be contacted with each other in a line before the addition to a polymerization reaction vessel. The maturing time is sufficient to be not less than 0.5 minute. Also, the prepared catalyst composition is stable for several days.

By using such a catalyst (catalyst composition) can be obtained a conjugated diene-based polymer having a cis-1,4 bond content of not less than 90%, a vinyl bond content of not more than 1.2% and an active terminal. Moreover, the cis-1,4 bond content and vinyl bond content can be adjusted easily by controlling the polymerization temperature.

In the step (1), the conjugated diene-based polymer having the active site is reacted with a compound X, whereby there is obtained a primary modified conjugated diene-based polymer in which the compound X is introduced into the active terminal of the conjugated diene-based polymer.

The compound X used in the step (1) is a compound having a functional group A indicating the reactivity to the active terminal of the conjugated diene-based polymer and at least one reactive functional group B. At this moment, the functional group A and the functional group B may be same or different and include, for example, ketene group, isocyanate group, thioisocyanate group, carboimide group and so on.

As the compound X are preferably mentioned 4,4'-diphenylmethane diisocyanate, polymethylene polyphenyl polyisocyanate, 2,4-tolylene diisocyanate, 2,6-tolylene diisocyanate, 1,6-hexamethylene diisocyanate, 4,4'-dicyclohexylmethane diisocyanate, isopropylidene bis(4-cyclohexylisocyanate), xylylene diisocyanate, 3,3'-dimethyl-4,4'-biphenyl diisocyanate, 3,3'-dimethoxy-4,4'-biphenyl diisocyanate, 3,3'-dimethyl-4,4'-diphenylmethane diisocyanate, 1,5-naphthalene diisocyanate, bis(2-isocyanateethyl)fumarate, 2,4-tolylenedithio isocyanate, 4,4'-diphenylmethanedithio isocyanate, 1,6-hexamethylenedithio isocyanate and so on. In the production method of the modified conjugated diene-based polymer according to the invention, a heterocumulene compound having two or more isocyanate groups is preferably used as the compound X, and the use of polymethylene polyphenyl polyisocyanate is particularly preferable. Moreover, the compounds X may be used alone or in a combination of two or more.

The amount of the compound X used is preferably 0.02 mmol-20 mmol, more preferably 0.1 mmol-10 mmol, particularly preferably 0.2 mmol-5 mmol per 100 g of the monomer. When the amount of the compound X used is less than 0.02 mmol, primary modification reaction does not proceed sufficiently, and the functional group reacting with a compound Y may not be introduced sufficiently into the conjugated diene-based polymer, while when it exceeds 20 mmol, the number of functional groups reacting with a compound Y in the conjugated diene-based polymer is saturated and is not preferable in economical reasons.

The primary modification reaction is preferable to be conducted by solution reaction. The solution in this reaction may be a solution containing an unreatced monomer used, for example, in the polymerization of the conjugated diene-based polymer. The primary modification reaction system is not particularly limited and may be conducted by using a batch type reactor or may be continuous type using an apparatus such as a multistage continuous reactor, an in-line mixer or the like. Moreover, the primary modification reaction is important to be carried out after the completion of the polymerization reaction and before various operations required for desolvation treatment, water treatment, heat treatment and polymer isolation.

As the temperature of the primary modification reaction can be used the polymerization temperature of the conjugated diene-based polymer itself. Concretely, it is preferably 0° C.-120° C., more preferably 10° C.-100° C. As the temperature becomes lower, it tends to raise the viscosity of the resulting polymer (primary modified conjugated diene-based polymer), while as the temperature becomes higher, the active terminal of the polymer is easily deactivated. Also, the tire required for the primary modification reaction is preferably 5 minutes-5 hours, more preferably 15 minutes-1 hour.

In the primary modification reaction, the active terminal of the conjugated diene-based polymer is reacted with the functional group A of the compound X to provide a primary modified conjugated diene-based polymer. In order to further react with the compound Y in the following secondary modification reaction (step (2)), however, it is necessary that at least one of functional groups B in the compound X is left at an unreacted state.

Subsequently, in order to produce the modified conjugated diene-based polymer according to the invention, it is required to provide a secondary modified conjugated diene-based polymer through the step (2). In the step (2), the primary modified conjugated diene-based polymer obtained in the step (1) is reacted with the compound Y, whereby there can be obtained a secondary modified conjugated diene-based polymer in which the compound y is introduced into the reactive functional group B derived from the compound X.

The compound Y used in the step (2) is a compound having a functional group C indicating the reactivity to the reactive functional group B derived from the compound X and at least one primary amino group or protected primary amino group. As the functional group C are mentioned amino group, imino group, mercapto group, hydroxyl group and the like. Moreover, the functional group C may be a primary amino group or a protected primary amino group.

As the compound Y are preferably mentioned hexamethylene diamine, heptamethylene diamine, nonamethylene diamine, dodecamethylene diamine, decamethylene diamine, 1,5-naphthalene diamine, 1,8-naphthalene diamine, 1,3-bis (aminomethyl)cyclohexane, 1,4-bis(aminomethyl)cyclohexane, ethylene diamine, diethylene triamine, triethylene tetramine, tetraethylene pentamine, pentaethylene hexamine and so on.

When the compound Y has a protected primary amino group, for example, as such a compound Y are preferably mentioned hexamethyl disilazane, N-chlorohexamethyl disilazane, N-bromohexamethyl disilazane, 1-(3-bromopropyl)-2,2,5,5-tetramethyl-1-aza-2,5-dicyacyclopentane, 1-(3-chloropropyl)-2,2,5,5-tetramethyl-1-aza-2,5-dicyacyclopentane and the like.

The secondary modification reaction may be successively conducted with the above primary modification reaction, which is preferable to be conducted by a solution reaction likewise the primary modification reaction. The solution in this reaction may be a solution containing an unreacted monomer used, for example, in the polymerization of the conjugated diene-based polymer. Also, the secondary modification reaction system is not particularly limited, and may be conducted by using a batch type reactor or may be continuous type using an apparatus such as a multistage continuous reactor, an in-line mixer or the like likewise the primary modification reaction. Moreover, the secondary modification reaction is important to be carried out after the completion of the polymerization reaction and before various operations required for desolvation treatment, water treatment, heat treatment and polymer isolation.

The amount of the compound Y used is preferably 0.02 mmol-20 mmol, more preferably 0.1 mmol-10 mmol, particularly preferably 0.2 mmol-5 mmol per 100 g of the monomer. When the amount of the compound Y used is less than 0.02 mmol, the secondary modification reaction does not proceed sufficiently, and the dispersibility with a filler is not developed sufficiently but also the effect of improving the fracture properties is not developed, while when it exceeds 20 mmol, the dispersibility of the filler and the effect of improving the properties are saturated and are not preferable in economical reasons.

As the temperature of the secondary modification reaction may be used the temperature of the primary modification reaction itself. Concretely, it is preferably 0° C.-120° C., more preferably 10° C.-100° C. As the temperature becomes lower, it tends to raise the viscosity of the resulting polymer (secondary modified conjugated diene-based polymer), while as the temperature becomes higher, the active terminal of the polymer is easily deactivated. Also, the tire required for the secondary modification reaction is preferably 5 minutes-5 hours, more preferably 15 minutes-1 hour.

In the step (2), it is preferable to use a catalyst promoting the reaction between the functional group B derived from the compound X in the primary modified conjugated diene-based polymer and the functional group C of the compound Y (catalyst for addition reaction). Concretely, it is preferable to add a catalyst promoting the reaction between the functional group B derived from the compound X in the primary modified conjugated diene-based polymer and the functional group C of the compound Y (catalyst for addition reaction) after the addition of the compound X in the step (1) or after the addition of the compound Y in the step (2). As such a catalyst for addition reaction can be used a compound having a tertiary amino group, or a compound containing one or more elements belonging to any of Group 4A, Group 2B, Group 3B, Group 4B and Group 5B in the Periodic Table. A compound containing one or more elements of titanium (Ti), zirconium (Zr), bismuth (Bi), aluminum (Al) and tin (Sn) is further preferable. It is particularly preferable that the compound constituting the catalyst is an alkoxide, a carboxylate or an acetylacetonate complex salt.

As the catalyst for addition reaction may be concretely mentioned titanium-containing compounds such as tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, tetra(2-ethylhexyl)titanium, bis (octanedioleate)bis(2-ethylhexyl)titanium, tetra(octanedioleate)titanium, titanium lactate, titanium dipropoxybis(triethanolaminate), titanium dibutoxybis (triethanolaminate), titanium tributoxy stearate, titanium tripropoxy stearate, titanium tripropoxy acetylacetonate, titanium dipropoxybis(acetylacetonate), titanium tripropoxy-ethyl acetoacetate, titanium propoxyacetylacetonate bis (ethylacetylacetate), titanium tributoxy acetylacetonate, titanium dibutoxybis(acetylacetonate), titanium tributoxyethyl acetoacetate, titanium butoxyacetylacetonate bis(ethylacetoacetate), titanium tetrakis(acetylacetonate), titanium diacetylacetonate bis(ethylacetoacetate), bis(2-ethylhexanoate)titanium oxide, bis(laurate)titanium oxide, bis(naphthate)titanium oxide, bis(stearate)titanium oxide, bis(oleate) titanium oxide, bis(linorate)titanium oxide, tetrakis(2-ethylhexanoate)titanium, tetrakis(laurate)titanium, tetrakis (naphthate)titanium, tetrakis(stearate)titanium, tetrakis (oleate)titanium, tetrakis(linorate)titanium and so on.

Also, the catalyst for addition reaction may include, for example, tris(2-ethylhexanoate)bismuth, tris(laurate)bismuth, tris(naphthate)bismuth, tris(stearate)bismuth, tris(oleate)bismuth, tris(linorate)bismuth, tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium trobutoxyethylacetoacetate, zirconium butoxyacetylacetonate bis (ethylacetoacetate), zirconium tetrakis(acetylacetonate), zirconium diacetylacetonate bis(ethylacetoacetate), bis(2-ethylhexanoate)zirconium oxide, bis(laurate)zirconium oxide, bis(naphthate)zirconium oxide, bis(stearate)zirconium oxide, bis(oleate)zirconium oxide, bis(linorate)zirconium oxide, tetrakis(2-ethylhexanoate)zirconium, tetrakis (laurate)zirconium, tetrakis(naphthate)zirconium, tetrakis (stearate)zirconium, tetrakis(oleate)zirconium, tetrakis (linorate)zirconium and so on.

Further, the catalyst for addition reaction may include, for example, triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminum tris (acetylacetonate), aluminum tris(ethylacetoacetate), tris(2-ethylhexanoate)aluminum, tris(laurate)aluminum, tris (naphthate)aluminum, tris(stearate)aluminum, tris(oleate) aluminum, tris(linorate)aluminum and so on.

Moreover, the catalyst for addition reaction may include bis(n-octanoate)tin, bis(2-ethylhexanoate)tin, bis(laurate)tin, bis(naphthoenate)tin, bis(stearate)tin, bis(oleate)tin, dibutyltin diacetate, dibutyltin di-n-octanoate, dibutyltin di-2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate), di-n-octyltin bis (2-ethylhexylmaleate) and so on.

The amount of the catalyst for addition reaction used is preferably 0.1-10, more preferably 0.5-5 as a molar ratio of mol number of the compound exemplified as the catalyst to total of unreacted functional group A and functional group B existing in the reaction system. When the molar ratio is less than 0.1, the modification reaction (concretely, secondary modification reaction) does not proceed sufficiently, while when it exceeds 10, the effect as the catalyst for addition reaction is saturated and is not preferable in economic reasons.

The modified conjugated diene-based polymer according to the invention can be recovered by adding a shortstop or a polymerization stabilizer to the reaction system, if necessary, after the completion of the step (1) and step (2) and then conducting desolvation and drying operations conventionally well-known in the production of the modified conjugated diene-based polymer. Also, when the compound Y contains the protected primary amino group, it is preferable to conduct (3) a step of hydrolyzing the secondary modified conjugated diene-based polymer to deprotect the protected primary amino group derived from the compound Y after the completion of the step (1) and step (2). Thus, the modified conjugated diene-based polymer having the primary amino group is obtained, which can be used as a modified conjugated diene-based polymer in the above rubber composition. Moreover, the usual method can be used in the hydrolysis.

EXAMPLES

The following examples are given in illustration of the invention and are not intended as limitations thereof.

(Polymer A)

Into an autoclave of 5 L purged with nitrogen are charged 2.4 kg of cyclohexane and 300 g of 1,3-butadiene in a nitrogen atmosphere. Into the autoclave is charged a catalyst composition, which is previously prepared by reacting and maturing a solution of neodymium versatate (0.09 mmol) in cyclohexane, a solution of methylalumoxane (hereinafter referred to as "MAO")(3.6 mmol) in toluene, a solution of hydrogenated diisobutylaluminum (hereinafter referred to as "DIBAH") (5.5 mmol) and diethylaluminum chloride (0.18 mmol) in toluene and 1,3-butadiene (4.5 mmol) as a catalyst component at 40° C. for 30 minutes, and then polymerization is carried out at 60° C. for 60 minutes. The reaction conversion of 1,3-butadiene is approximately 100%. The resulting polymer solution is placed into a solution of methanol containing 0.2 g of 2,4-di-tert-butyl-p-cresol to stop polymerization, and thereafter the solvent is removed by steam stripping and the drying is conducted on rolls at 110° C. to obtain an unmodified polymer A (conjugated diene-based polymer). As measured by the following method, the thus obtained polymer A has a Mooney viscosity [$ML_{1+4}$ (100° C.)] of 18, a molecular weight distribution (Mw/Mn) of 2.2, a cis-1,4 bond content of 96.3% and a 1,2-vinyl bond content of 0.64%.

(1) Mooney Viscosity [$ML_{1+4}$ (100° C.)]

It is measured according to JIS K6300 with a L rotor under conditions that a preheating time is 1 minute and an operating time of the rotor is 4 minutes and a temperature is 100° C.

(2) Molecular Weight Distribution (Mw/Mn)

It is measured through a gel permeation chromatography (trade name "HLC-8120GPC", made by Toso Co., Ltd.) with a differential refractometer as a detector under the following conditions and calculated as a conversion value to standard polystyrene.

Column: two columns of trade name "GMHHXL" (made by Toso Co., Ltd.)

Column temperature: 40° C.

Mobile phase: tetrahydrofuran

Flow rate: 1.0 ml/min

Sample concentration: 10 mg/20 ml (3) Microstructure [cis-1,4 Bond Content (%), 1,2-vinyl Bond Content (%)]

It is measured by an infrared method (Morello method) using a Fourier transform infrared spectrophotometer (trade name "FT/IR-4100", made by Nippon Bunkosha Co., Ltd).

(Polymer B)

After polymerization is carried out in the same manner as in the production example of the polymer A, the polymer solution is further kept at a temperature of 60° C. and a solution of polymethylene polyphenyl polyisocyanate (trade name "PAPI*135", made by Dow Chemical Japan Co., Ltd.) (hereinafter referred to as "cMDI") (4.16 mmol as converted isocyanate group (NCO)) in toluene is added to conduct reaction (primary modification reaction) for 15 minutes. Subsequently, a solution of hexamethylene diamine ((hereinafter referred to as "HMDA") (2.08 mmol) in toluene is added to conduct reaction (secondary modification reaction) for 15 minutes. Thereafter, the reaction product is placed in a methanol solution containing 1.3 g of 2,4-di-tert-butyl-p-cresol to stop polymerization, and then the solvent is removed by steam stripping and the drying is conducted on roll at 110° C. to obtain a polymer B (modified conjugated diene-based polymer). As measured by the above-mentioned method, the thus obtained polymer B has a Mooney viscosity [$ML_{1+4}$ (100° C.)] of 35, a molecular weight distribution (Mw/Mn) of 2.3, a cis-1,4 bond content of 96.2% and a 1,2-vinyl bond content of 0.59%.

(Polymer C)

After polymerization is carried out in the same manner as in the production example of the polymer A, the polymer solution is further kept at a temperature of 60° C. and a solution of 4,4'-bis(diethylamino)benzophenone (2.08 mmol) in toluene is added to conduct reaction for 15 minutes. Thereafter, the reaction product is placed in a methanol solution containing 1.3 g of 2,4-di-tert-butyl-p-cresol to stop polymerization, and then the solvent is removed by steam stripping and the drying is conducted on roll at 110° C. to obtain a polymer C. As measured by the above-mentioned method, the thus obtained polymer C has a Mooney viscosity [$ML_{1+4}$ (100° C.)] of 24, a molecular weight distribution (Mw/Mn) of 2.0, a cis-1,4 bond content of 96.0% and a 1,2-vinyl bond content of 0.58%.

(Polymer D)

After polymerization is carried out in the same manner as in the production example of the polymer A, the polymer solution is further kept at a temperature of 60° C. and a solution of trimethylolpropane tris[(3-(1-aziridinyl))propionate] (2.08 mmol) in toluene is added to conduct reaction for 15 minutes. Thereafter, the reaction product is placed in a methanol solution containing 1.3 g of 2,4-di-tert-butyl-p-cresol to stop polymerization, and then the solvent is removed by steam stripping and the drying is conducted on roll at 110° C. to obtain a polymer D. As measured by the above-mentioned method, the thus obtained polymer D has a Mooney viscosity [$ML_{1+4}$ (100° C.)] of 33, a molecular weight distribution (Mw/Mn) of 2.2, a cis-1,4 bond content of 96.3% and a 1,2-vinyl bond content of 0.62%.

(Polymer E)

A glass bottle of about 1 liter volume provided with a rubber plug is dried and purged with nitrogen, and a solution of dried and purified butadiene in cyclohexane and a dried cyclohexane are charged into the glass bottle purged with nitrogen, respectively, at a state of charging 400 g of the cyclohexane solution of butadiene (butadiene concentration: 12.0 mass %). Then, 0.30 mL of tert-butyllithium (1.57 M) and 0.185 mL of 2,2-di(2-tetrahydrofuryl)propane (0.2 N) are added to conduct polymerization in a water bath of 50° C. for 1.5 hours. Further, the polymer solution is kept at a temperature of 50° C. and added with cMDI (0.84 mmol as converted to isocyanate group (NCO)) to conduct reaction for 15 minutes, and thereafter reacted with HDMA (0.42 mmol). Thereafter, the reaction product is placed in a methanol solution containing 1.3 g of 2,4-di-tert-butyl-p-cresol to stop polymerization, and then the solvent is removed by steam stripping and the drying is conducted on roll at 110° C. to obtain a polymer E. As measured by the above-mentioned method, the thus obtained polymer E has a Mooney viscosity [$ML_{1+4}$ (100° C.)] of 42, a molecular weight distribution (Mw/Mn) of 1.70, a cis-1,4 bond content of 45.1% and a 1,2-vinyl bond content of 18.33%.

(Polymer F)

After polymerization is carried out in the same manner as in the production example of the polymer A, the polymer solution is further kept at a temperature of 60° C. and a solution of 1-trimethylsilyl-2-methylchloro-1-aza-2-silacyclopentane (2.08 mmol) in toluene is added to conduct reaction for 15 minutes. Thereafter, the reaction product is placed in a methanol solution containing 1.3 g of 2,4-di-tert-butyl-p-cresol to stop polymerization, and then the solvent is removed by steam stripping and the drying is conducted on roll at 110° C. to obtain a polymer F (modified conjugated diene-based polymer). As measured by the above-mentioned method, the thus obtained polymer F has a Mooney viscosity [$ML_{1+4}$ (100° C.)] of 26, a molecular weight distribution (Mw/Mn) of 2.1, a cis-1,4 bond content of 96.4% and a 1,2-vinyl bond content of 0.62%.

Next, a rubber composition is prepared according to a compounding recipe shown in Table 1 and vulcanized at 145° C. for 33 minutes to obtain a vulcanized rubber, and the resistance to crack growth and low heat buildup (3% tan δ) thereof are measured by the following methods. The results are shown in Tables 2-3.

(4) Resistance to Crack Growth

A crack of 0.5 mm is formed in a central portion of a test specimen of JIS No. 3 and fatigue is repeatedly applied thereto at room temperature under a strain of 50-100% to measure the repeat number until the sample is cut. The values at each strain are measured and an average value thereof is used. In Table 2, examples and comparative examples compounded with carbon black having same nitrogen adsorption specific surface area are represented by an index on the basis that a comparative example compounded with the polymer A is 100. In Table 3. it is represented by an index on the basis that Comparative Example 1 is 100. The larger the index value, the better the resistance to crack growth.

(5) Low Heat Buildup (3% tan δ)

It is measured using a dynamic spectrometer (made by Rheometric Corporation in USA) under conditions that a tensile dynamic strain is 3%, a frequency is 15 Hz and a temperature is 50° C. In Table 2, examples and comparative examples compounded with carbon black having same nitrogen adsorption specific surface area are represented by an index on the basis that a comparative example compounded with the polymer A is 100. In Table 3. it is represented by an index on the basis that Comparative Example 1 is 100. The smaller the index value, the better the low heat buildup (low loss factor).

TABLE 1

|  | Compounding substances | parts by mass |
| --- | --- | --- |
| First stage | polymer *1 | 50.0 |
| (non-productive | natural rubber (NR) | 50.0 |
| mixing stage) | carbon black *2 | 50.0 |
|  | stearic acid | 2.0 |
|  | antioxidant 6C *3 | 3.5 |
| Second stage | zinc oxide | 3.0 |
| (productive mixing | antioxidant *4 | 1.0 |
| stage) | vulcanization accelerator CZ-G *5 | 0.4 |
|  | vulcanization accelerator DM-P *6 | 0.2 |
|  | sulfur | 1.4 |

*1 Polymers A-F, kind of polymer used is shown in Tables 2-3
*2 Nitrogen adsorption specific surface area of carbon black used is shown in Tables 2-3
*3 N-(1,3-dimethylbutyl)-N'-phenyl-p-phenylene diamine
*4 Nocrac 224, made by Ouchi Shinko Chemical Industrial Co., Ltd.
*5 N-cyclohexyl-2-benzothiazolyl sulfenamide
*6 di-2-benzothiazolyl disulfide

TABLE 2

| | Comparative Example 1 | Example 1 | Comparative Example 2 | Example 2 | Comparative Example 3 | Example 3 | Comparative Example 4 | Example 4 |
|---|---|---|---|---|---|---|---|---|
| Nitrogen adsorption specific surface area ($N_2SA$) of carbon black ($m^2/g$) | 42 | 42 | 78 | 78 | 145 | 145 | 42 | 42 |
| Kind of polymer | Polymer A | Polymer B | Polymer A | Polymer b | Polymer A | Polymer B | Polymer E | Polymer F |
| cis-1,4 bond content (%) | 96.3 | 96.2 | 96.3 | 96.2 | 96.3 | 96.2 | 45.1 | 96.4 |
| vinyl bond content (%) | 0.63 | 0.59 | 0.63 | 0.59 | 0.63 | 0.59 | 18.33 | 0.62 |
| Resistance to crack growth (index) | 100 | 124 | 100 | 118 | 100 | 104 | 75 | 121 |
| 3% tan δ (index) | 100 | 68 | 100 | 71 | 100 | 89 | 65 | 69 |

As seen from the results of Table 2, the rubber compositions of Examples 1-4 each compounded with a modified conjugated diene-based polymer having a cis-1,4 bond content of not less than 90%, a vinyl bond content of not more than 1.2% and a primary amino group can largely improve the resistance to crack growth and low heat buildup as compared with the rubber compositions of Comparative Examples 1-3 each compounded with a modified conjugated diene-based polymer having a cis-1,4 bond content of not less than 90% and a vinyl bond content of not more than 1.2% but having no primary amino group. Also, as seen from the results of Examples 1-4, the effect of improving the resistance to crack growth and low heat buildup can be largely improved when carbon black having a nitrogen adsorption specific surface area of 20-180 $m^2/g$ is compounded. Moreover, in the rubber composition of Comparative Example 4, the cis-1,4 bond content of the polymer E compounded is low, so that the resistance to crack growth is largely deteriorated though the low heat buildup is improved.

TABLE 3

| | Comparative Example 1 | Comparative Example 5 | Comparative Example 6 | Example 1 |
|---|---|---|---|---|
| Nitrogen adsorption specific surface area ($N_2SA$) of carbon black ($m^2/g$) | 42 | 42 | 42 | 42 |
| Kind of polymer | Polymer A | Polymer C | Polymer D | Polymer B |
| cis-1,4 bond content (%) | 96.3 | 96.0 | 96.3 | 96.2 |
| vinyl bond content (%) | 0.64 | 0.58 | 0.62 | 0.59 |
| Modifying agent | unmodified | a *7 | b *8 | c *9 |
| Resistance to crack growth (index) | 100 | 107 | 108 | 124 |
| 3% tan δ (index) | 100 | 87 | 85 | 68 |

*7 4,4'-bis(diethylamino)benzophenone
*8 trimethylolpropane tris[3-(1-aziridinyl)propionate]
*9 cMDI (primary modification reaction) and HMDA (secondary modification reaction)

As seen from The results of Table 3, the rubber composition of Example 1 compounded with the polymer B having a primary amino group introduced can largely improve the resistance to crack growth and low heat buildup as compared with the rubber composition of Comparative Example 5 or 6 compounded with the polymer C or D having a tertiary amino group introduced.

Next, a vulcanized rubber is obtained in the same manner as mentioned above except that the amount of carbon black compounded in the compounding recipe of Table 1 is changed, and the resistance to crack growth and low heat buildup thereof are measured by the above-mentioned methods. The results are shown in Table 4.

In Table 4 is shown the amount of carbon black compounded per 100 parts by mass of the rubber component (polymer and natural rubber). Also, the resistance to crack growth and low heat buildup (3% tan δ) are represented in the examples having the same amount of carbon black compounded by an index on the basis that the comparative example compounded with the polymer A is 100.

TABLE 4

| | Comparative Example 7 | Example 5 | Comparative Example 8 | Example 6 |
|---|---|---|---|---|
| Nitrogen adsorption specific surface area ($N_2SA$) of carbon black ($m^2/g$) | 42 | 42 | 42 | 42 |
| Amount of carbon black compounded per 100 parts by mass of rubber component (part by mass) | 10 | 10 | 90 | 90 |
| Kind of polymer | Polymer A | Polymer B | Polymer A | Polymer B |
| cis-1,4 bond content (%) | 96.3 | 96.2 | 96.3 | 96.2 |
| vinyl bond content (%) | 0.63 | 0.59 | 0.63 | 0.59 |
| Resistance to crack growth (index) | 100 | 110 | 100 | 123 |
| 3% tan δ (index) | 100 | 78 | 100 | 73 |

As seen from the results of Table 4, the effect of improving the resistance to crack growth and low heat buildup can be largely improved when the amount of carbon black compounded per 100 parts by mass of the rubber component is within a range of 10-100 parts by mass.

The invention claimed is:

1. A method of producing a modified conjugated diene-based polymer, characterized by comprising:
   (1) a step of reacting a conjugated diene-based polymer having a cis-1,4 bond content of not less than 90% and a vinyl bond content of not more than 1.2% and an active terminal with a compound X having a functional group A indicating a reactivity to the active terminal and at least one reactive functional group B (provided that the functional group A and the functional group B may be same) to obtain a primary modified conjugated diene-based polymer; and
   (2) a step of reacting the primary modified conjugated diene-based polymer with a compound Y having a functional group C indicating a reactivity to the reactive functional group B and at least one primary amino group or protected primary amino group (provided that the functional group C may be the primary amino group or the protected primary amino group) to obtain a secondary modified conjugated diene-based polymer.

2. A method of producing a modified conjugated diene-based polymer according to claim 1, wherein the conjugated diene-based polymer has a vinyl bond content of not more than 0.8%.

3. A method of producing a modified conjugated diene-based polymer according to claim 1, which further comprises (3) a step of hydrolyzing the secondary modified conjugated diene-based polymer to deprotect the protected primary amino group derived from the compound Y.

4. A method of producing a modified conjugated diene-based polymer according to claim 1, wherein the conjugated diene-based polymer is synthesized with a rare earth metal as a catalyst.

5. A method of producing a modified conjugated diene-based polymer according to claim 1, wherein the compound X is polymethylene polyphenyl polyisocyanate and the compound Y is hexamethylene diamine.

6. A modified conjugated diene-based polymer produced by a method as claimed in claim 1.

* * * * *